United States Patent [19]

Champlin

[11] 4,127,275
[45] Nov. 28, 1978

[54] SELF-DISENGAGING STATIC SEAL

[75] Inventor: John W. Champlin, Jamestown, R.I.

[73] Assignee: The United States of America as represented by the Secretary of the Navy, Washington, D.C.

[21] Appl. No.: 870,153

[22] Filed: Jan. 17, 1978

[51] Int. Cl.² .................... F16J 15/38; F16J 15/54
[52] U.S. Cl. .................................... 277/6; 277/8; 277/32; 277/65; 277/81 R; 277/137
[58] Field of Search .................... 277/1, 5–9, 277/9.5, 32, 58, 65, 81 R, 94, 136, 137

[56] References Cited
U.S. PATENT DOCUMENTS

| | | | |
|---|---|---|---|
| 2,835,514 | 5/1958 | McGahan | 277/74 X |
| 2,860,895 | 11/1958 | Mosbacher | 277/8 X |
| 2,925,291 | 2/1960 | Bygbjerg | 277/9 X |
| 3,088,442 | 5/1963 | Self et al. | 277/7 X |
| 3,241,844 | 3/1966 | Morley | 277/92 |
| 3,749,412 | 7/1973 | Lingley | 277/81 R |
| 3,874,674 | 4/1975 | Germain et al. | 277/8 |

FOREIGN PATENT DOCUMENTS

| | | | |
|---|---|---|---|
| 933,389 | 8/1963 | United Kingdom | 277/81 |
| 1,081,869 | 9/1967 | United Kingdom | 277/5 |

Primary Examiner—Robert S. Ward, Jr.
Attorney, Agent, or Firm—Richard S. Sciascia; Arthur A. McGill; Prithvi C. Lall

[57] ABSTRACT

A static seal is utilized to provide a fluid boundary in place of a dynamic seal during underwater storage. The static seal is formed by an O-ring disposed between a threaded collar and retainer. The collar is held in alignment with a shaft by means of slots so that the collar rotates with the shaft in either rotational direction but is capable of moving independent of the shaft in the axial direction. The collar is threaded to the retainer by turning the collar with respect to the retainer in a clockwise direction. This forms the O-ring static seal permitting underwater storage of an underwater vehicle for an extended period of time. Following storage the operation of the shaft in a counter-clockwise direction disengages the collar from the retainer thereby releasing the static seal so that the dynamic seal comes into utilization.

8 Claims, 2 Drawing Figures

SELF-DISENGAGING STATIC SEAL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to fluid seals and more particularly to a static sealing system suitable for use in conjunction with a dynamic sealing system. The primary function of the static sealing system is to provide watertight integrity to an underwater vehicle propulsion system during long-term wet storage.

Presently, some underwater propulsion vehicles use carbon face seal rings on their drive systems for maintaining watertight integrity. These work fine under dynamic conditions and for short time static conditions of no more than three weeks. However, there are advantages in long-term wet storage for a period in excess of three weeks. Under these conditions the systems depending on carbon face seal rings are prone to leakage.

SUMMARY OF THE INVENTION

Accordingly, it is a general purpose and object of the present invention to provide an improved fluid sealing system. It is a further object that the system be compatible for use with the presently used dynamic seal on an underwater vehicle propulsion system. Another object is that the system be suitable for operating over a long period of time during underwater storage. These and other objects of the invention and the various features and details of construction and operation will become apparent from the specification.

This is accomplished in accordance with the present invention by providing a static seal as an addition to the present dynamic seal. The static seal has the capability of disengaging itself upon start-up of the vehicle propulsion system. This is an important function as the dynamic face seal must run wet.

The static seal is affixed to the propulsion shaft in such a manner that the sealing mechanism has the capability of moving axially but not rotationally with respect to the shaft. In other words, when the shaft turns, the static seal turns with respect to the shaft. The dynamic seal, as is well known in the art, has one part rotating with respect to the shaft and another part stationary. To form the static seal, two parts are threaded to each other, thereby compressing an O-ring to form the static seal. This static seal is in series with the dynamic seal so that the static seal provides fluid integrity at the same place in the overall system as the dynamic seal. On operation of the propulsion shaft the two parts compressing the O-ring are unthreaded, breaking the static seal, leaving the dynamic seal the sole sealing mechanism.

DESCRIPTION OF THE PREFERRED EMBODIMENT

Figure 1:
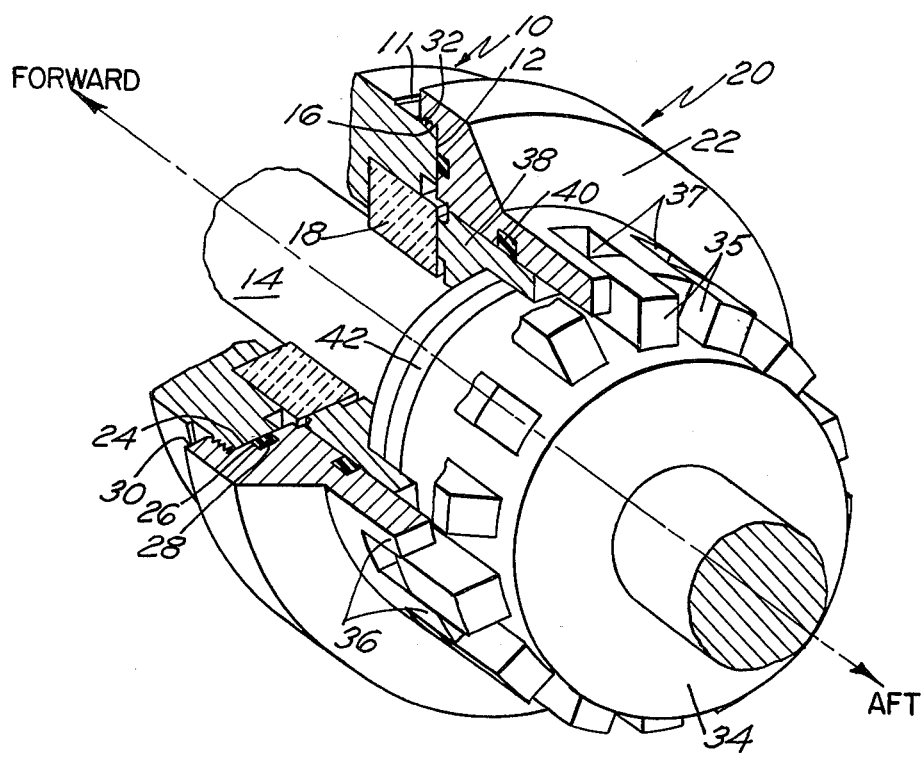
FIG. 1 is a perspective view, partly in section, of the shaft fluid sealing mechanism during storage in accordance with the present invention.

Referring now to the figures there is generally shown retainer 10, having a lip 11 and an aft face 12. The aft face 12 is located perpendicular to the center line of a shaft 14 and has a surface finish suitable to affect an O-ring type static seal for protecting the shaft 14 from external ambient fluids. The outer periphery of retainer 10 has a short section of screw thread 16. The thread 16 is to be left hand if the shaft 14 turns clockwise as viewed from the aft end, or right hand if the shaft to be sealed turns counter-clockwise. The retainer 10 is affixed to its underwater vehicle (not shown) so as not to rotate relative to the vehicle body. The inward portion of the vehicle body is located forward of the retainer 10. A carbon face dynamic seal ring 18 is affixed to retainer 10 in the usual manner.

A housing 20 has a collar 22 with forward face 24, that is perpendicular to the axis of a shaft 14. The face 24 has a groove 26 in which there is embedded a resilient element such as an O-ring 28. Forward of the face 24, on the collar 22 there is a rim 30 that has an inner screw thread 32 for mating with the screw thread 16 on retainer 10. Obviously, the retainer 10 or collar 22 could have the outer or inner screw thread. The choice is optional to the designer. Such a selection has no bearing on the function of the device and would be chosen as a design expedient for each individual application.

The shaft 14 has a cylindrical piece 34 with abutments 35. The cylindrical piece 34 and abutments 35 can be manufactured as a part of the shaft 14 or can be affixed as separate pieces as long as watertight integrity is maintained between the shaft 14 and cylindrical piece 34. The collar 22 has fingers 36 with slots 37 therebetween. The slots 37 mate with abutments 35 so that the collar 22 is capable of sliding in an axial direction but not in a radial direction with respect to shaft 14.

A mating ring 38 forms a watertight seal with the carbon face seal 18. This combination forms a dynamic seal when shaft 34 is rotating. However, history shows that leakage between pieces 18 and 38 normally occurs over extended periods of time when the system is stored in submerged position and the shaft is not rotating.

The mating ring 38 also abuts collar 22 and has a shoulder that abuts cylindrical piece 34. A static seal is formed between collar 22 and mating ring 38 by O-ring 40. Another static seal is made by O-ring 42 located between cylindrical piece 34 and mating ring 38.

Prior to storage, collar 22 is threaded onto retainer 10. At this time the effective static seals are those made by O-rings 28, 40 and 42. O-ring 28 provides the seal that during operation of the shaft is made by the combination of mating ring 38 and carbon face seal ring 18. The location of the components during underwater storage is shown in FIG. 1.

Figure 2:
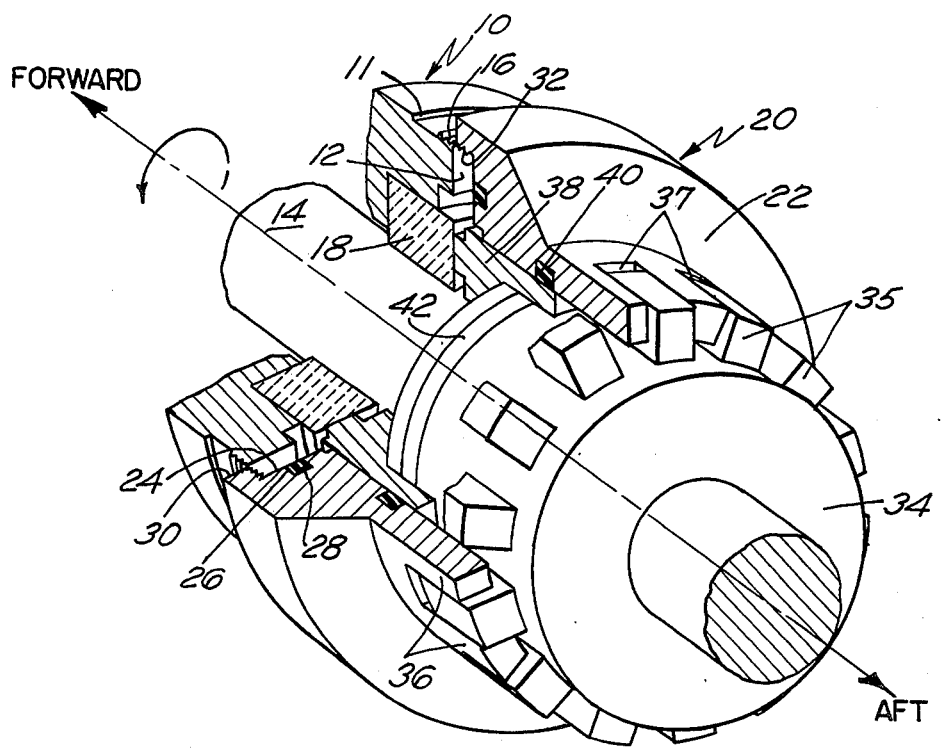
FIG. 2 is a perspective view, partly in section, during shaft rotation of the mechanism of FIG. 1.

On operation of the underwater vehicle the system is as shown in FIG. 2. At this time the shaft 14 is rotating and collar 22 is automatically unthreaded from retainer 10. This unthreading occurs due to the rotation of collar 22 with shaft 14 while retainer 10 remains stationary with respect to the underwater vehicle. The collar rotates with the shaft due to the interlocking fingers 37 with abutments 35.

The rotating elements in FIG. 2 are shaft 14, cylindrical piece 34, abutments 35, collar 20, O-rings 28, 40 and 42, and mating ring 38. Stationary pieces are retainer 10 and carbon face seal 18. Two static seals formed at this time are O-rings 40 and 42 and a dynamic seal is formed between carbon face seal ring 18 and mating ring 38. The many components rotating in conjunction with shaft 14 are no problem in operation due to these components being relatively light in weight as compared to the entire shaft structure which normally includes a propeller (not shown). The collar 20 and associated O-rings 26 and 40 move aft in an axial direction with respect to retainer 10, carbon face seal ring 18, mating ring 38, O-ring 42, abutments 35, cylindrical piece 34 and shaft 14. During this operation, the dynamic seal comprising carbon face seal ring 18 and mating ring 38 provide the fluid seal that was previously made by O-ring 28.

There has, therefore, been described a sealing system suitable for use during underwater storage. In the system a static seal replaces the dynamic seal used during rotation of the shaft. During operation of the shaft, the static seal automatically disconnects leaving the dynamic seal to provide its normal function.

It will be understood that various changes in details, materials, steps and arrangement of parts, which have been herein described and illustrated in order to explain the nature of the invention, may be made by those skilled in the art within the principle and scope of the invention as expressed in the appended claims.

What is claimed is:

1. A self-disengaging static seal system comprising:
    a shaft assembly;
    a dynamic seal means for providing a fluid boundary for said shaft assembly; static seal means having a first static seal for providing a fluid boundary in series with said dynamic seal means;
    said shaft assembly having a second static seal abutting said dynamic seal means; and
    disconnect means for disconnecting said first static seal upon operational rotation of said shaft assembly, said disconnect means having a third static seal abutting said dynamic seal means.

2. A self-disengaging static seal system according to claim 1 wherein said dynamic seal means has a seal ring and a mating ring having a common axis, said dynamic seal means adapted to form a dynamic seal at the interface of said seal ring and said mating ring, said mating ring adapted to rotate relative to said seal ring on said common axis.

3. A self-disengaging static seal system according to claim 2 wherein said shaft assembly further comprises:
    a shaft;
    a cylindrical piece having a common axis with said cylindrical piece enclosing said shaft along a portion of said axis said cylindrical piece having a groove for holding said second static seal; and
    a plurality of abutments radially spaced along said cylindrical piece.

4. A self-disengaging static seal system according to claim 3 wherein said disconnect means further comprises:
    a retainer having screw threads, said retainer further having an aft face perpendicular to said shaft; and
    a collar further having a forward face perpendicular to said shaft.

5. A self-disengaging static seal system according to claim 4 wherein said first static seal is disposed between the aft face of said retainer and the forward face of said collar.

6. A self-disengaging static seal according to claim 4 wherein said collar further comprises slots partially enclosing said abutments so that said collar can move axially and is inhibited from moving radially with respect to said collar.

7. A self-disengaging static seal system comprising:
    a shaft;
    a cylindrical piece radially enclosing a portion of said shaft;
    projecting abutments radially surrounding and connected to said cylindrical piece;
    a mating ring abutting said cylindrical piece;
    a first static seal disposed between said mating ring and said cylindrical piece;
    a collar partially enclosing and having a common axis with said mating ring and said cylindrical piece, said collar having finger projections disposed between said projecting abutments;
    a second static seal disposed between said collar and said mating ring;
    a retainer having threads adapted to mate with said collar;
    a seal ring affixed to said retainer and aligned with said mating ring to form a dynamic seal; and
    a third static seal disposed between said retainer and said collar.

8. A self-disengaging static seal system comprising:
    a dynamic face seal having a seal ring and a mating ring aligned with said seal ring for forming a dynamic seal, said mating ring having a common axis with said seal ring, said mating ring adapted to be rotated with respect to said seal ring;
    a shaft assembly abutting said mating ring and adapted to turn in unison with said mating ring;
    static sealing means located between said shaft assembly and said mating ring for providing a fluid boundary in series with said dynamic seal; and
    disconnect means for disconnecting said static seal means upon start-up of said shaft assembly.

* * * * *